US006295369B1

(12) United States Patent
Gordon

(10) Patent No.: US 6,295,369 B1
(45) Date of Patent: Sep. 25, 2001

(54) MULTI-DIMENSIONAL COLOR IMAGE MAPPING APPARATUS AND METHOD

(75) Inventor: Kevin K. Gordon, Austin, TX (US)

(73) Assignee: Shapiro Consulting, Inc., Austin, TX (US)

( * ) Notice: Subject to any disclaimer, the term of this patent is extended or adjusted under 35 U.S.C. 154(b) by 0 days.

(21) Appl. No.: 09/187,899

(22) Filed: Nov. 6, 1998

(51) Int. Cl.[7] .................................................. G06K 9/00
(52) U.S. Cl. ................................. 382/162; 358/518
(58) Field of Search .................................. 382/165, 162, 382/167, 170; 358/518, 519, 520

(56) References Cited

U.S. PATENT DOCUMENTS

| 4,935,816 | 6/1990 | Faber | 348/578 |
|---|---|---|---|
| 5,850,472 | * 12/1998 | Alston et al. | 382/162 |
| 5,874,988 | * 2/1999 | Gu | 348/97 |
| 5,937,086 | * 8/1999 | Taguchi | 382/165 |

* cited by examiner

Primary Examiner—Joseph Mancuso
Assistant Examiner—Ali Bayat

(74) Attorney, Agent, or Firm—J. Nevin Shaffer, Jr.; Shaffer & Culbertson, LLP

(57) ABSTRACT

A multidimensional color image mapping apparatus (10) has an image input and output device (12) connected to at least one computer system (16). An operator monitor (14) for operating and monitoring the device is connected to the image input and output device (12) through at least one computer system (16) for processing an input image. Computer software (78) is provided on the computer system (16) for applying any image processing operation and any mathematical function to an image as a function of at least two input variables where the input variables are distinct color components from one or more color models. In the preferred embodiment, the input image is a video and is processed in a digital format. Further, in a preferred embodiment, there is a master computer (16) and a plurality of additional computers and/or processors (28) for manipulating the image. Manipulation of the input images may be selected from a group of manipulations including grain addition, image and edge sharpening/softening, chrominance 1 modification, luminance 1 modification, red modification, green modification and blue modification. Further, color models may be combined and selected one or more from a group including RGB, HSV, HSI and YCrCb color models or any other color model.

21 Claims, 8 Drawing Sheets (2 of 8 Drawing Sheet(s) Filed in Color)

R = RED
G = GREEN
B = BLUE
Y = YELLOW
C = CYAN
M = MAGENTA
W = WHITE
BK = BLACK

MULTI-DIMENSIONAL COLOR IMAGE MAPPING APPARATUS AND METHOD

BACKGROUND OF THE INVENTION

This invention relates to a multi-dimensional color image mapping apparatus and method.

Prior art image processing operations may generally be categorized as point to point, matrix or convolution, frequency based, temporal, and geometric. Point to point operations are performed on each pixel in the image. Matrix operations are performed on each pixel, but take into account some finite number of surrounding pixels. Frequency based operations deal with transforming the image mathematically into what is called the frequency domain, and then applying operations on the frequency domain before converting the image back to its original format. Temporal processing operations deal with multiple frames in a sequence over time (moving pictures). Geometric operations perform image rotation, scaling, translation and resizing (resampling), among others. The current span of technology for enhancing images performs changes on an image that are broad in scope and therefore, while improving an image in certain areas, they create problems in others. Electronically captured images, particularly video (NTSC, PAL, or hi-definition video) are inherently uneven. They are uneven in terms of light level, color level, color and edge representation, among others. Because they are uneven, applying prior art imaging processing operations to the image results in a processed image that still contains its inherent "unevenness". That is, certain portions of the image improve while others are taken "over the edge".

U.S. Pat. No. 4,935,816 to Faber is illustrative of the current state of the art in some image enhancement and modification techniques. For a variety of reasons, discussed further hereafter, video taped images are less appealing to the human eye than film images. One of the differences, generally subtle and overlooked by the viewer, is that film has "grain". Faber looks to enhance video taped images by, among other things, the addition of mixed, clipped and filtered noise so as to attempt to simulate the look of film. Faber discloses the technique of adding grain over an entire image. This results in the addition of grain, obviously, everywhere, including areas which don't have grain on film. As a result, this and other prior art image enhancement techniques are a two step forward, one step back exercise.

In short, a drawback to the image enhancement and manipulation technologies known in the art is that manipulation that enhances an image in one area degrades the image in another area at the same time. This is particularly true with color images. Thus, there is a need in the art for providing an apparatus and method for manipulating images which manipulates an image only in areas where manipulation is required and which avoids manipulation of an image in areas which degrade the image instead of enhancing it. It, therefore, is an object of this invention to provide a multi-dimensional color image mapping apparatus and method for selective multi-dimensional color mapping manipulation of particular color model components of an image.

SHORT STATEMENT OF THE INVENTION

Accordingly, for images obtained in accordance with a particular image format, wherein the image is identified by particular color components represented by one or more consistent color models, the multidimensional color image mapping apparatus of the present invention includes an image input and output device connected to a computer system. An operator monitor for operating and monitoring is connected to the computer system. A computer software program on the computer system is provided for applying any image processing operation and any mathematical function to an image as a function of at least two input variables, where the input variables are distinct color components from one or more color models. As a result, an input image, video, digital, or otherwise, is manipulated at all appropriate areas of the image while avoiding manipulation of the image where unnecessary or inappropriate.

In one embodiment of the invention, more than one computer system and processor is utilized in conjunction with a master computer system, all of which are connected to the image input and output device. Additionally, an analog to digital and a digital to analog converter is provided in one embodiment connected to the image input and output device. In a further embodiment, the computer program enables manipulations of the image by means of one of a group of manipulations including grain addition, image and edge sharpening/softening, chrominance 1 (first pass) modification, luminance 1 (first pass) modification, red modification, green modification, and blue modification. Additional modifications include chrominance 2 (second pass) modification, luminance 2 (second pass) modification, color based chrominance modification, color based luminance modification, color based red modification, color based green modification, and color based blue modification.

BRIEF DESCRIPTION OF THE DRAWINGS

The patent or application file contains at least one drawing executed in color. Copies of this patent or patent application publication with color drawings wil be provided by the Office upon request and payment of the necessary fee.

Other objects, features and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
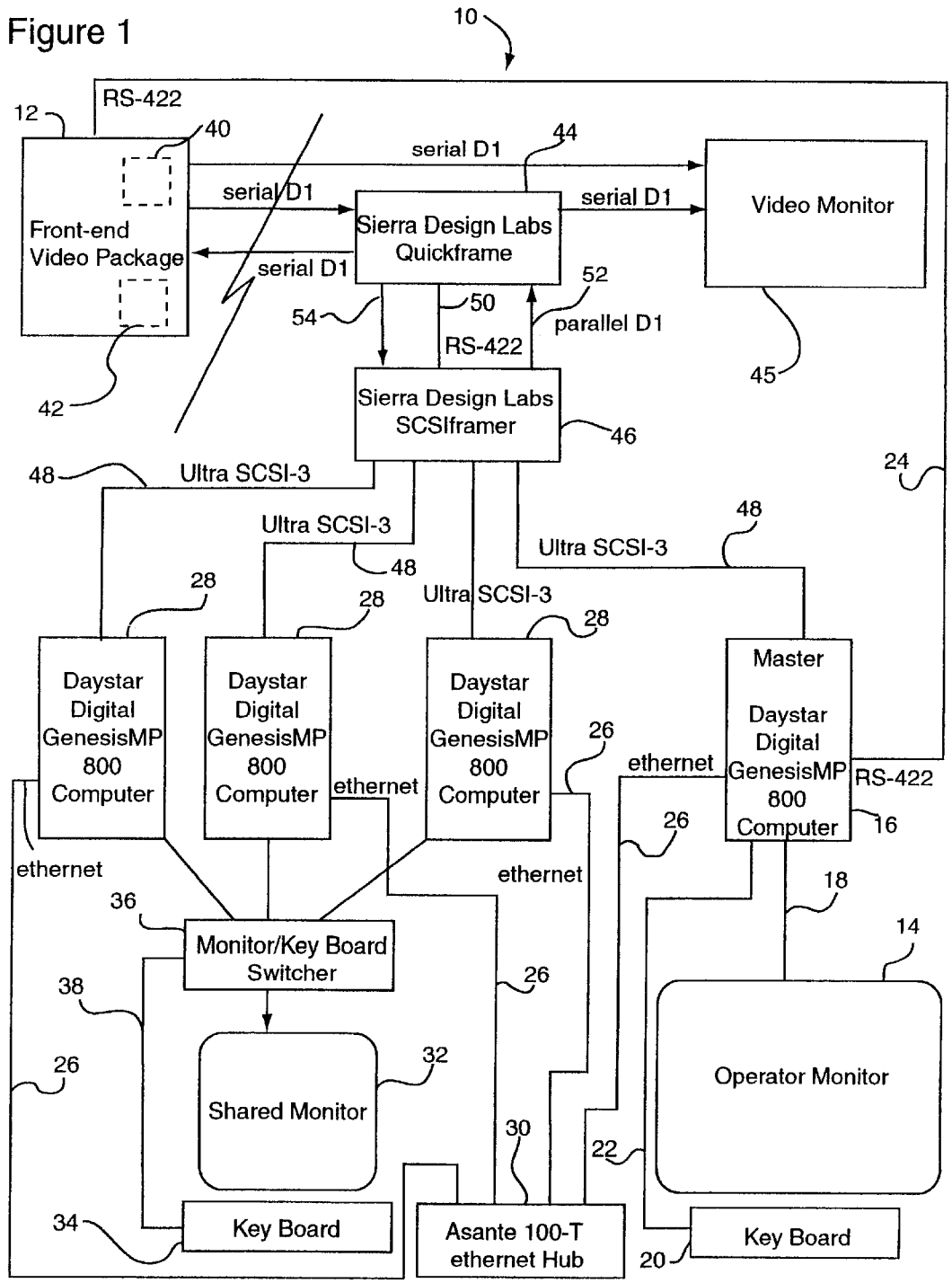
FIG. 1 is a schematic diagram illustrating a preferred embodiment of the multidimensional color image mapping apparatus of the present invention.

The preferred embodiment of the present invention is illustrated by way of example in FIGS. 1 and 3 through 9. With specific reference to FIG. 1, multidimensional color image mapping apparatus 10 includes image input and output device 12, operator monitor 14 and computer system 16. Operator monitor 14 is connected to computer system 16 by connection 18 and further includes keyboard 20, connected by connection 22 to computer system 16.

Computer system 16 is connected to image input and output device 12 by RS-422 connection 24. In a preferred embodiment, computer system 16 is a "master" computer connected via ether net connections 26 to multiple computer systems and processors 28 through ethernet hub 30. Multiple computer systems 28 may also be accessed by shared monitor 32 through keyboard 34 connected to monitor/keyboard switcher 36 via connection 38.

In a preferred embodiment, analog to digital converter 40 and digital to analog converter 42 are part of and/or connected to image input/output device 12. Once the image is in a desired format, it may be operated on by multi-dimensional color image mapping apparatus 10 as disclosed more fully hereafter. Any means known in the art can be utilized to store the video image and selectively operate on the video image. In one embodiment, the entire image is stored on a recording device 44. Again, this can be any device known in the art such as the Sierra Design Labs QUICK FRAME brand digital disc recorder. Access to the recorder can be by any device known in the art such that image access device 46 could be of any known type such as Sierra Design Labs SCSI framer. The image access device 46 is connected to each of the computer systems, including master computer system 16 and multiple computer systems 28 via ultra SCSI-3 connections 48. Image access device 46 is connected to image recorder 44 by connection RS422 connection 50. Further, image access device 46 is connected by parallel connection 52 and image recorder 44 is connected to image access device 46 by serial connection 54.

In operation, image input/output device 12 is loaded with a video tape containing one or more video frames, "images", to be manipulated. In particular, it is a color video image and preferably it is in digital format. If it is not in digital format, the analog image is converted to digital by passing through analog to digital converter 40 so as to provide serial digital input to multidimensional color image mapping apparatus 10. The manipulation of the video image at image input/output device 12 is accomplished through operator monitor 14 connected to computer system 16 on which computer program 78 has been loaded. In one embodiment, serial digital images are passed to image recorder 44 for access by image access device 46. Once the source video images have been recorded on image recorder 44, they can be processed and enhanced by master computer system 16, as well as multiple computer systems 28. Importantly, each computer system 16 and multiple computer systems 28 are connected to image access device 46 independently via separate ultra SCSI-3 connections 48. The user of multi-dimensional color image mapping apparatus 10 can selectively manipulate the video images recorded on image recorder 44 through operator monitor 14 so as to select any desired recorded image for manipulation. Again, once the source images have been recorded on image recorder 44, they can be processed and enhanced by all four computer processors 16 and 28. The image(s) can be observed at any point in the process on video monitor 45 which is connected to image input/output device 12 as well as image recorder 44.

Next, the operator defines categories and specifics of each enhancement that he or she chooses for manipulation. In a preferred embodiment of the invention, an image is identified by particular color components represented by one or more consistent color models, discussed more fully hereafter. Importantly, however, computer software program 78 located on master computer system 16 and/or multiple computer systems 28 enables the operator to select particular color components for image manipulation. Color components may be manipulated only in areas where manipulation is required and left alone in areas where the images are already satisfactorily pleasing to the eye.

Figure 2:
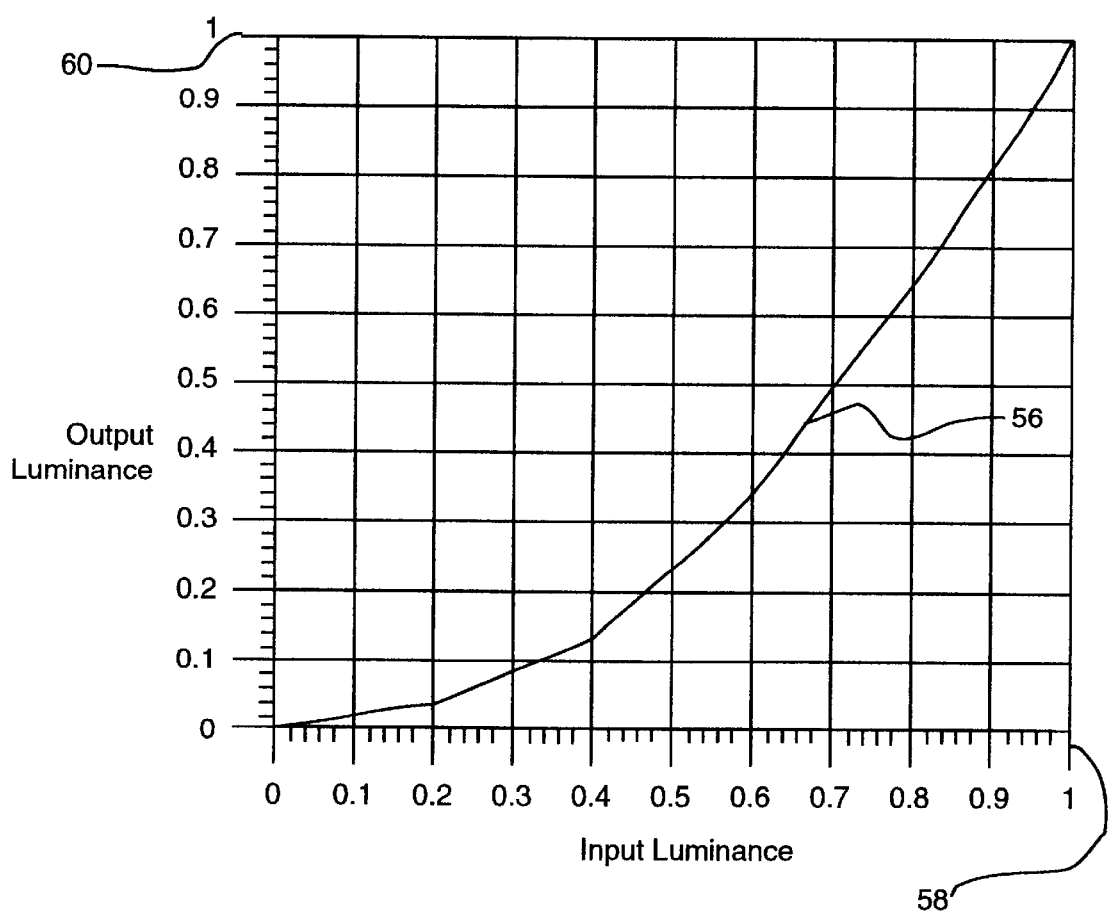
FIG. 2 is a graph illustrating prior art image modification technology.

By way of explanation, reference is now made to prior art FIG. 2 which illustrates how prior image manipulation solutions operate globally, on one input variable, on an image and do not allow for the fine level of control that this invention provides. For example, one current technique for image manipulation is shown in FIG. 2 for modification of contrast. For the purposes of the invention, these techniques are called one dimensional because they are a function of just one input variable. In this prior art technique, input luminance is modified according, for example, to the square function shown therein. The curve 56, or map, in FIG. 2 illustrates how original values in an image are to be modified. The horizontal (X) axis 58 represents all possible input values and the vertical (Y) axis 60 represents what the corresponding output value should be. The problem with prior art techniques, simply put, is that this gross, one dimensional application of a given image enhancement operation such as a simple square function, benefits the image in some areas, but diminishes the pleasing effect in others where no modification was desired and/or necessary.

Figure 3:
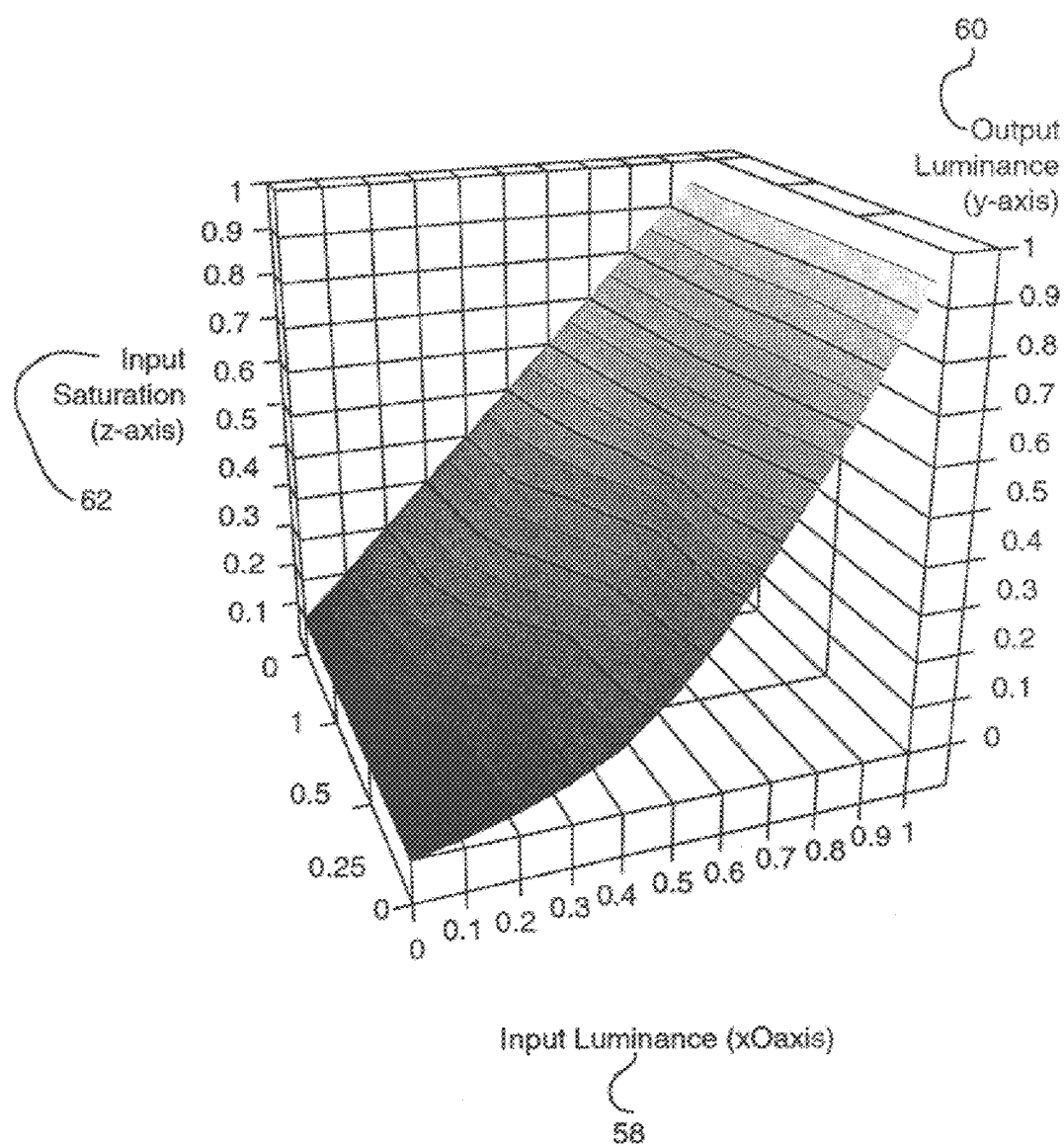
FIG. 3 is a graph illustrating image modification in accordance with the present invention.

Referring now to FIG. 3, the multidimensional color image mapping apparatus 10 of the present invention is illustrated by way of example demonstrating the increased manipulative capability of the invention. Saturation is a color model component from the HSV color space, discussed more fully hereafter, which represents the amount of pure color that is present in a given pixel of an image. Saturation may range from 0% to 100%, but is defined as a real number ranging from 0.0 to 1.0 on the Z axis 62. The three dimensional curve 64 in FIG. 3 represents what an operator of multidimensional color image mapping apparatus 10 accomplishes that is significantly different in its results than the two dimensional curve 56 illustrated in FIG. 2. What this particular color image mapping illustrates in FIG. 3 is the operator's decision to modify the luminance in a given image only where the saturation is low, and as the saturation increases toward 1.0 to not change the original luminance value of the pixel. Importantly, multidimensional color image mapping apparatus 10 is not associated with any particular function, such as the square function $((f)(x)=x^2)$ as illustrated in FIG. 2 applied to the luminance channel. Any mathematical function can be used. Further, by adding Z axis 62 mapping control to the luminance X axis 58 where the Z axis 62 represents input saturation, an extraordinarily powerful and specific manipulation is enabled. It is important to note that these two axes, X axis 58 representing luminance and Z axis 62 representing input saturation, are utilizing color components that are from different color models, as will be discussed more fully hereafter.

Figure 4A:
FIG. 4a, b, and c is an illustration of an original image, an image showing representative prior art enhancements and enhancement by the present invention, respectively.
Figure 4B:
Figure 4C:

Referring now to FIG. 4a, an original color source D1 video frame "image" is shown. FIG. 4b shows the result of prior art image enhancement techniques on the source D1 video frame after application of the $X^2$ function to luminance (FIG. 2) showing some areas enhanced and others degraded by the process. That is, the desire was to create "contrast" in the image, but many areas have gotten too dark. As a result, the image is harsh and displeasing. FIG. 4c shows the result of application of the multi-dimensional function of the present invention to the original source D1 video frame image improving it where appropriate and leaving it untouched in originally satisfactory areas. That is, certain areas of the image have darkened while others have not changed, thus creating a separation of objects in the image and a pleasing result.

A fourth axis may be added as well. The fourth axis, which for the purposes of discussion herein will be called the alpha axis 68, further expands the capabilities of multi-dimensional color image mapping apparatus 10. The alpha axis 68 could be defined to be hue from the HSV/HSI color model. In FIG. 3 above, this would further allow the operator to control the distribution of the square function to the source image via a hue map. Since a diagram of the map is in four dimensions, it is difficult to show. However, because hue is represented as a circle, it is possible to visualize a family of 360 distinct three dimensional curves lying next to each other and going around in a circle, one for each degree of hue. In general, the multidimensional color image mapping apparatus 10 of the present invention allows the operator to apply any operation (point to point or matrix based, for example) and mathematical function to a source image such that the function is linear or non-linear and is a function of at least two input variables (and possibly three or more, hence multidimensional) where the input variables are distinct color components from one or more color models.

Figure 5:
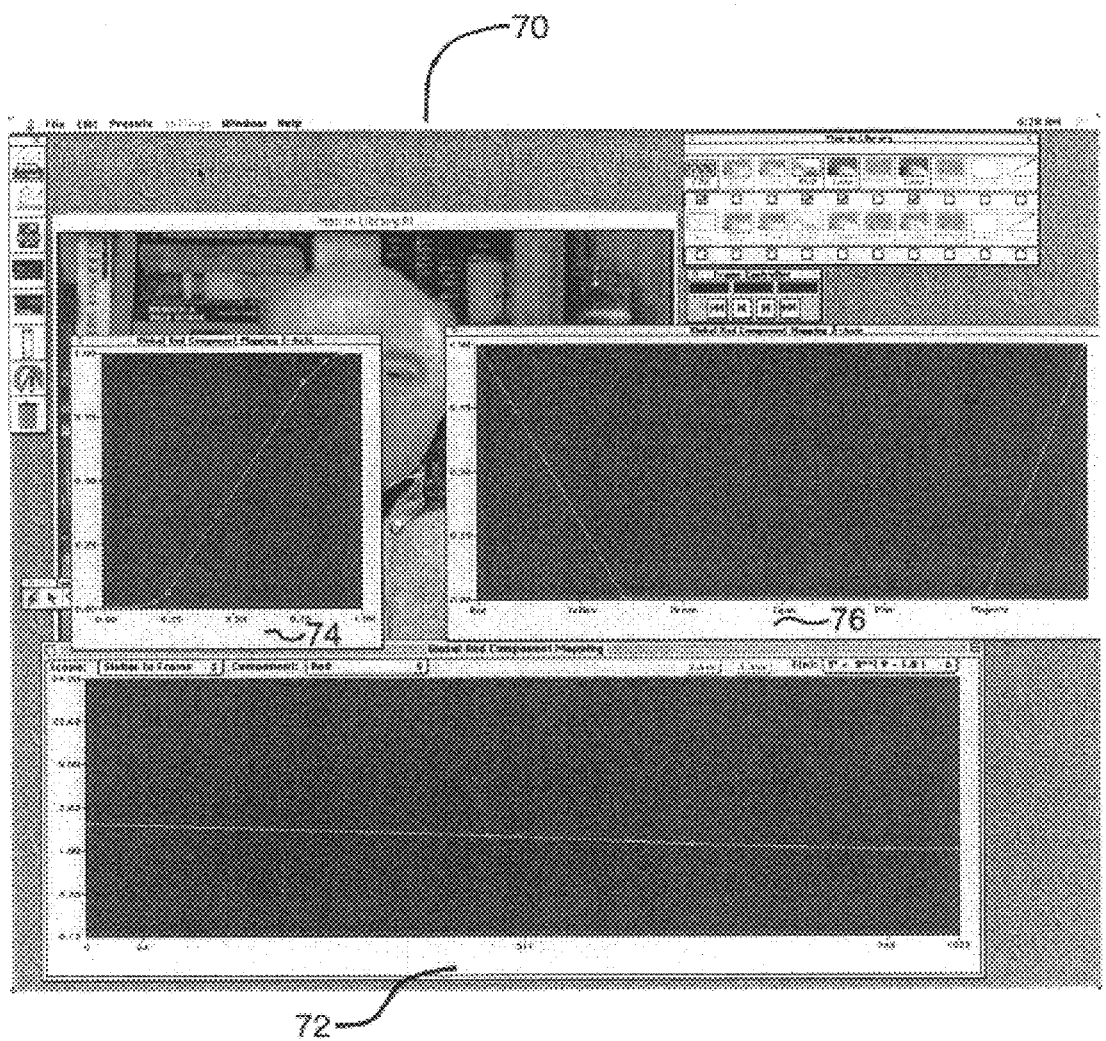
FIG. 5 is an illustration of the operator monitor screen of the present invention with a visual representation of the invention of the present invention.

Referring to FIG. 5, an image 70 has been selected for manipulation by an operator. In this illustration, multidimensional color image mapping apparatus 10 is utilized to remap the input image 70 red component based upon input luminance 72, input saturation 74, and input hue 76. Computer software program 78 (not shown) is loaded on computer system 16 and/or 28 and is utilized by an operator through operator monitor 14 to modify the image as desired. The computer software program 78 applies a non-linear, logarithmically defined function to the red component as desired utilizing point to point, or other operations. Computer software program 78 can be a combination of old and new software known in the art for accomplishing the inventive purpose set forth herein. That is to say, a programmer of reasonable skill is capable of creating a satisfactory program for accomplishing the objectives of the invention as set forth herein with ordinary effort. Further, while the invention specifically discloses the use of computer software program 78 on computer system 16, which are also of any known computer type known in the art, computer software program 78 can be hardware just as easily, again, as is known in the art.

Computer system 16 also preferably includes a graphical user interface that resides within a machine readable medium to direct the operation of the computer system 16 through operation of operator monitor 14. Computer system 16 and multiple computer systems 28 can be implemented utilizing any suitable computer, such as an IBM Aptiva ™, a product of International Business Machines, located in Armonk, N.Y. "Aptiva" is a registered trademark of International Business Machines Corporations.

A preferred embodiment of the present invention may be implemented in other types of data processing systems, such as intelligent workstations or mini-computers. One such computer is the IBM RISC/6000, a product of International Business Machines, located in Armonk, NY. "RISC System/6000" is a trademark of International Business Machines Corporation, and also can be referred to as the RISC/6000.

Referring now to FIGS. 6, 7, 8, and 9, Applicant's multi-dimensional color image mapping apparatus 10 is more fully understood by a discussion of color models and associated color components. For the purposes of Applicant's invention, a color model is some mathematical representation of color. Certain color models are better suited for certain usage than others. As an example, images displayed on a television set or computer monitor use the RGB (red, green, blue) color model 80. Both display methods use a scanning electron beam that strikes phosphorescent cells with varying amounts of energy, producing colored light. The RBG color model 80 is well suited to represent the properties of emitted light since RGB is an additive color model and colored light is additive in nature. The red, green, and blue elements of the RGB color model 80 are the components that comprise this model.

On the other hand, RGB is not a good color model for representing color and printing with inks on a surface. The cyan, magenta, yellow, black color model, or CYMK is a model that is subtractive in nature, and behaves likes inks do when they are mixed.

There are many other color models which are derivatives of the RGB model. One of these derivatives has been created to more closely follow the way that individuals think of color. It is called hue, saturation, and value or HSV. A derivative of the HSV model 98 is the HSI model 100, or hue, saturation, and intensity. Essentially, both of these color models describe a color first by its hue component, or basic color. That is, what color is it? Red, yellow, green, orange, purple, blue, cyan, etc. The saturation component describes how pure the color is—Is the red fire engine red or is it kind of washed out and pinkish? The value and intensity components both characterize how dark or bright the color is. The difference between value and intensity, in the HSV and HSI color models respectively, has to do with the dynamic range represented.

There are other derivative models which have been invented for the simple purpose of saving space when an image is quantized, or represented digitally. Such is the case with the color model embodied in the D1 digital video format. In D1, a pixel's color can be represented by two quantities, luminance and chrominance. Luminance and chrominance are the two components that make up a color model called YCrCb, where Y symbolizes luminance and Cr or Cb symbolize chrominance. The difference between Cr and Cb has to do with the physical position of the pixel on display; Cr is for odd numbered pixels and Cb is for even pixels. In the RGB model, a pixel is represented by three components. For storage purposes, it is obvious therefore, that D1 video digital requires only two thirds of the amount of space that an RGB representation of the same image requires.

Figure 6:
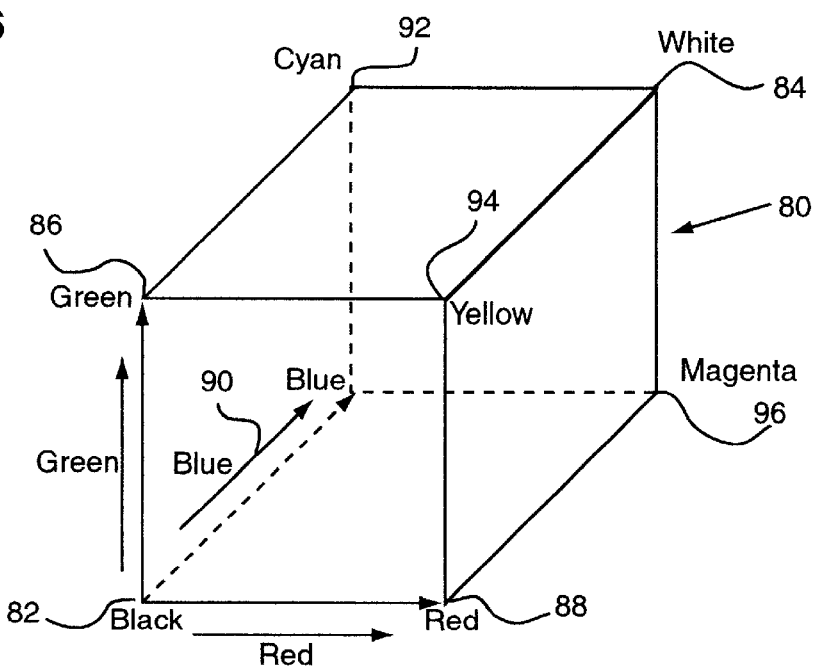
FIG. 6 is an illustration of the RGB color model cube.

Referring now to FIG. 6, the RGB color model 80 is represented. The RGB color model 80 is a three dimensional representation of color. As with any color model, the concept is that any color can be represented as a point within (including the surfaces of) the cube. In the model, red, green, and blue are three primary colors that can be added together in varying quantities to form any desired color.

The front, lower left point 82 represents pure black. The rear upper right hand point 84 represents pure white indicating the presence of 100% red, green and blue added together.

From point 82 if you move straight up vertically, then you are representing a gradually brighter green color representing 100% green at the front upper left point 86 on the cube. Along this axis, no amounts of either red or blue are present. Moving right along the front edge from point 82 toward the front lower left corner 88 represents incrementally increasing reds. The lower left edge 90 of the cube moving inward represents blue in a similar fashion. The three corners, labeled cyan 92, yellow 94 and magenta 96 represent 100% additions of two primaries, for example, the cyan 92 point on the rear upper left is a color composed of 100% blue and 100% green. Yellow 94 is 100% green and 100% red and magenta 96 is 100% red and 100% blue.

Grey scale values, where the amounts of red, green, and blue are equal and range from 0 to 100% can be found to lie on a diagonal line (not shown) that runs from point 82 to point 84.

On a television or computer screen, each pixel is actually composed of three, closely spaced red, green, and blue phosphor dots. Since the RGB color model 80 is additive in nature, it is not exactly intuitive for a person to work with and modify one or more of the color components. In fact, an individual can often produce unexpected and undesirable results by changing the values of red, green or blue in an image. An example of this difficulty is with color adjustments on a television set. Although a television directly operates in the RGB color model 80, a person cannot normally change the level of red, green or blue. Instead, a person is provided with a tint adjustment. The tint control is really working with hue, which is a color component of the HSV or HSI color models.

Figure 7:
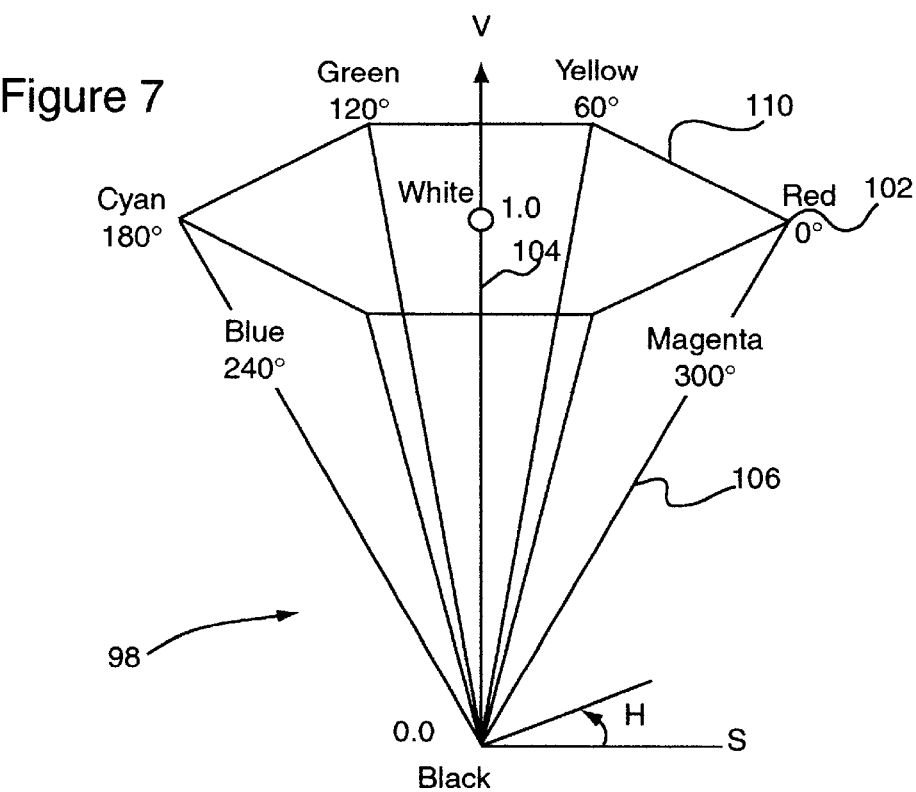
FIG. 7 is an illustration of the HSV single hexcone color model.

Referring now to FIG. 7, the HSV (hue, saturation, and value) model 98 is illustrated. The HSV color model 98 and HSI (hue, saturation, and intensity) color model 100 (See FIG. 8) are derivatives, again, of the RGB model 80, meaning they can be directly translated to and from the RGB color model 80.

These derivatives were developed to be more intuitive in manipulating colors in so far as to model the way individuals perceive and interpret color. In these models, the hue component defines the basic color (red, yellow, green, cyan, blue, etc.) and the saturation components describes the purity of the color, or how washed out it is. In this case the grey scale values from black to white are described as having a saturation of 0%. The value and intensity components of these models both describe relative brightness, but are distributed differently, as seen in the figures, and have different dynamic ranges on their respective spaces.

The HSV color model 98 is normally utilized by image processing operations or manipulating the colors and images, independent from their respective brightness levels. A three dimensional representation of the HSV color model 98 is shown in FIG. 6.

As with the RGB color model 80, the concept is that any color can be represented as a point within or on the "hexcone". The hue component of the HSV color model 98 is specified in angular degrees, from 0 degrees representing red at point 102 around a hexagonal path to 359 degrees. Primary colors exist every 120 degrees from 0 degrees at point 102 with secondary colors in between offset by 60 degrees. Complimentary colors are 180 degrees offset from one another. The saturation component is defined with increasing values from the center line 104 of the hexcone outward toward the side edges. The value component which describes the brightness of a color is represented in the vertical axis 106 from 0% black at point 108 at the bottom to 100% all along the top edge 110 of the cone.

To place a specific color on the HSV color model 98, first locate where the color belongs around the rim 110 of the hexcone. If it were say orange, then it would be at about 30degrees. Now move inwards toward the center line 104 as the saturation decreases. Finally, move downward toward point 108 as the brightness decreases. For example, pure bright red would be placed at point 102 on the top edge 110 corner labeled red. Any pure color that is fully illuminated would be placed on the top edge 110 of the hexcone, solely dependent upon the specific color.

Grey scale values, having no color present, lay on the vertical center line 104 of the hexcone, since the saturation of any grey scale value is by definition 0.

Figure 8:
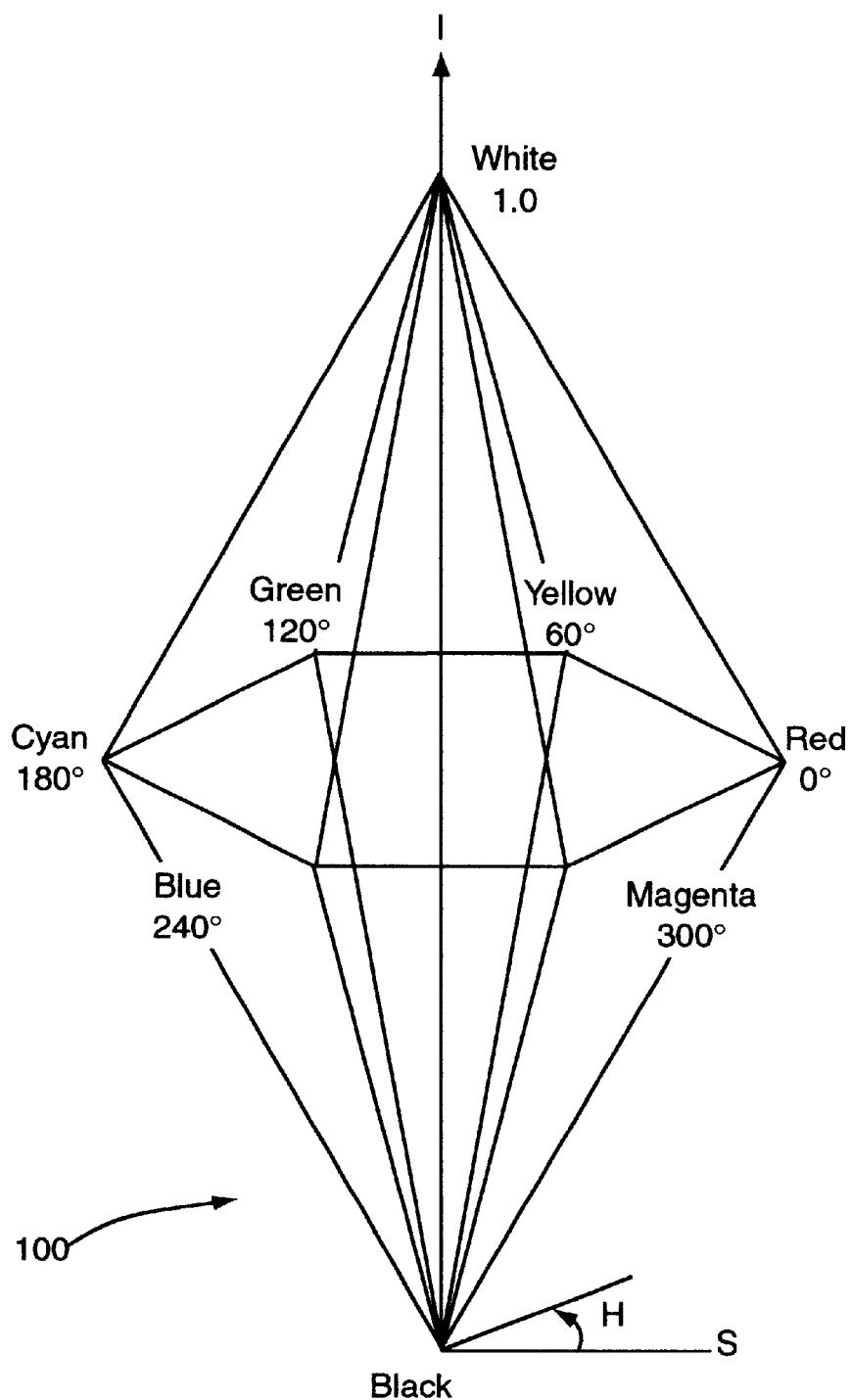
FIG. 8 is an illustration of the HSI double hexcone color model.

Referring now to FIG. 8, the HSI color model 100 differs from the HSV color model 98 in the mathematical computation of the brightness component (intensity versus value). The HSI color model 100 is well suited for many traditional image processing functions which operate by manipulating the brightness, since the range of calculated brightness is twice that of the HSV color model 98.

Figure 9:
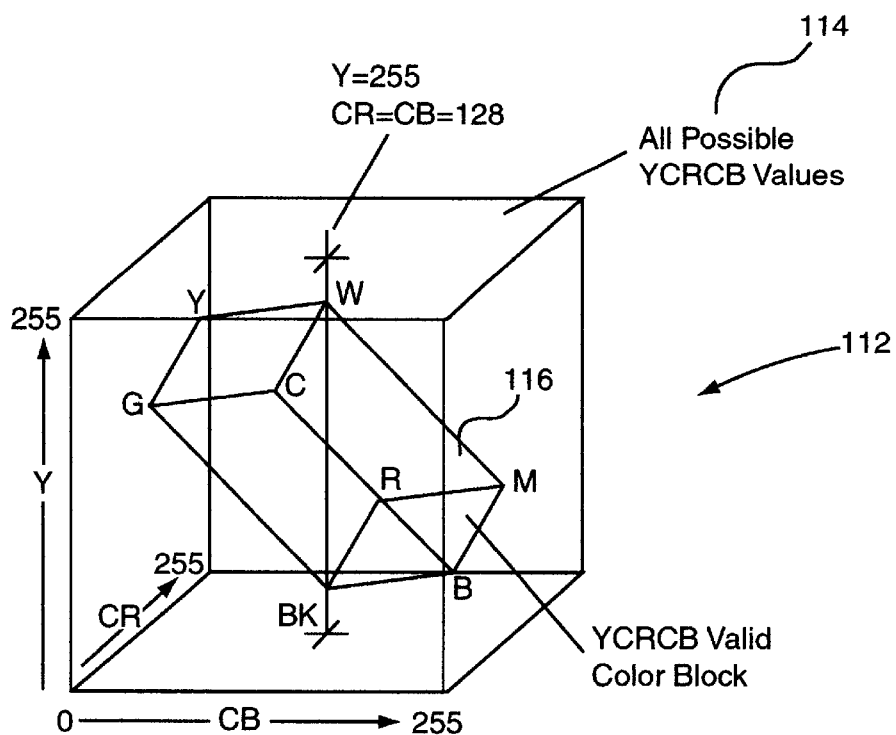
FIG. 9 is an illustration of the YCrCb color model.

Referring now to FIG. 9, the YCrCb color model 112 is illustrated. The YCrCb color model 112 was developed by an international committee of television professionals looking for a common digitally based format. The YCrCb color model 112 is a derivative of the RBG color model 80 and has only two components. The Y component represents the brightness quantity of a pixel. The Cr and Cb components represent color information. The Cr and Cb components can be thought of as representing both hue and saturation information as defined in the HSV color model 98 and the HSI color model 100. In FIG. 8, the outer cube 114 denotes the complete range of data, however, the YCrCb color model 112 requires YCrCb values to be located within inner color block 116 in order to be valid.

Applicant's multidimensional color image mapping apparatus 10 enables an operator to apply any operation and mathematical function to a source image such that the function is linear or non-linear and is a function of at least two input variables (and possibly three or more), where the input variables are distinct color components from one or more of the previously discussed or hereafter developed color models.

For example, Applicant's multi-dimensional color image mapping apparatus 10 enables the user to modify the red color component (RGB color model 80), based upon distinct mapping defined by: 1) the input luminance (YCrCb color model 112) and 2) the input saturation (HSV color model 98/HSI color model 100) and the input hue value (HSV/HSI color models 98 and 100 respectively).

In summary, with Applicant's invention, the operator is free to pick any color component to modify, then specify the color components for the input axes (X axis 58, Z axis 62 and alpha axis 68) upon which the operator defines distinct functions using the input axes and corresponding Y axes, for application to an image. Thus, Applicant's multi-dimensional color image apparatus 10 enables the modification, enhancement, and the creation of special effects very easily for the manipulation of color images.

While the multidimensional color image mapping apparatus and method of the present invention has been disclosed in connection in particular with color image manipulation for the purpose of image enhancement, it should be appreciated that it can be used in any environment where there is a need to manipulate an image such as, in particular, but not limited thereto, its applicability to the domain of information extraction.

While the present invention has been disclosed in connection with the preferred embodiment thereof, it should be understood that there may be other embodiments which fall within the spirit and scope of the invention as defined by the following claims.

What is claimed is:

1. For images obtained in accordance with a particular image format, wherein the image is identified by particular color components represented by one or more consistent color models, a multi-dimensional color image mapping apparatus comprising:

(a) image input and output means;

(b) at least one computer system for processing an input image connected to said image input and output means;

(c) operator monitor means for operating and monitoring connected to said computer system; and (d) a computer program on said computer system for applying an operator selected image processing operation to an operator selected color component of a recorded image, the operator selected image processing operation applied to the recorded image by an operator adjustable man with more than two axis dimensions where the axis are defined by distinct color components from one or more color models.

2. The apparatus of claim 1 wherein said image input and output means further comprises a video input and output means.

3. The apparatus of claim 1 wherein said at least one computer system further comprises a plurality of computer systems and processors for processing input images connected to said operator monitor means and a master computer system connected to said plurality of computer systems and processors and said operator monitor means so that said operator monitor means controls the operation of said plurality of said computer systems through said master computer system.

4. The apparatus of claim 3 wherein said at least one computer system comprises one master computer system and three slave computer systems connected to said operator monitor means.

5. The apparatus of claim 1 further comprising:

(a) an analog to digital converter means connected to said image input and output means; and (b) a digital to analog converter means connected to said image input and output means.

6. The apparatus of claim 1 wherein said computer program for selective multi-dimensional color mapping manipulation further comprises a computer program for selective multi-dimensional mapping manipulation of said input images from a group of manipulations, including grain addition, image and edge sharpening/softening, chrominance 1 modification, luminance 1 modification, red modification, green modification, and blue modification.

7. The apparatus of claim 6 further comprising a computer program for selective multi-dimensional color mapping manipulation from a group including chrominance 2 modification, luminance 2 modification, color-based chrominance modification, color-based luminance modification, color-based red modification, color-based green modification, and color based blue modification.

8. The apparatus of claim 1 wherein said computer program further comprises a computer program for selective multi-dimensional color mapping manipulation in more than two dimensions.

9. The apparatus of claim 8 further comprising a computer program for selective multi-dimensional color mapping manipulation using x, z, and alpha axis and their corresponding Y axis.

10. The apparatus of claim 1 wherein said one or more consistent color model is one from a group including RGB, HSV, HSI and YCrCb.

11. A computer program product comprising:

(a) a computer usable medium having computer readable program code means embodied in said medium for causing multi-dimensional color image mapping, said computer program product having;

(b) computer readable program code means for enabling an operator to effect the selection of one or more color models;

(c) computer readable program code means to effect the selection of an operator selected image processing operation, the image processing operation applied to a recorded image by a user adjustable map with more than two axis dimensions where the axis are defined by distinct color components from said one or more color models; and (d) computer readable program code means for the application of said image processing operation to an operator selected color component of the recorded image.

12. For images obtained in accordance with a particular image format, wherein the image is identified by particular color components represented by one or more consistent color models, a multidimensional digital color image mapping apparatus comprising:

(a) video input and output means;

(b) analog to digital converter means connected to said video input and output means;

(c) a digital to analog converter means connected to said video input and output means;

(d) at least one computer system for processing an input video image in digital format connected to said input and output means;

(e) operator monitor means for operating and monitoring connected to said computer system; and (f) a computer program on said computer system for applying an operator selected image processing operation to an operator selected color component of a recorded image, the operator selected image processing operation applied to the recorded image by an operator adjustable map with more than two axis dimensions where the axis are defined by distinct color components from one or more color models.

13. The apparatus of claim 12 wherein said at least one computer system further comprises a plurality of computer systems and a master computer system.

14. The apparatus of claim 12 wherein said computer program for selective multi-dimensional color mapping manipulation further comprises a computer program for selective multi-dimensional color mapping manipulation in more than two dimensions for more than one color component.

15. The apparatus of claim 12 wherein said one or more consistent color model is one from a group including RGB, HSV, HSI and YCrCb.

16. For images obtained in accordance with a particular image format, wherein the images are identified by particular color components represented by one or more consistent color models, a method for multi-dimensional colored image mapping comprising the steps of:

(a) providing an image to an image input and output means;

(b) connecting at least one computer system for processing an input image to said input and output means;

(c) connecting an operator monitor means to said image computer system;

(d) providing a computer program for applying an operator selected image processing operation to an operator selected color component of an input image, the operator selected image processing operation applied to the input image by an operator adjustable map with more than two axis dimensions where the axis are defined by distinct color components from one or more color models;

(e) operating said operator monitor means so as to direct said at least one computer system to selectively manipulate particular color components of said input image; and (f) operating said operator monitor means so as to send said input image to said input and output means for outputting said input image after selective manipulation.

17. The method of claim 16 further comprising the steps of:

(a) connecting an analog to digital converter to said image input and output means so that said input image is manipulated in a digital format; and (b) connecting a digital to analog converter to said image input and output means.

18. The method of claim 16 wherein the step of providing a computer program for selective multidimensional color mapping manipulation further comprises the step of selecting by operation of said operator monitor means multi-dimensional color mapping manipulation from a group including grain addition, image and edge sharpening/softening, chrominance 1 modification, luminance 1 modification, red modification, green modification, and blue modification.

19. The method of claim 18 further comprising the step of selecting multi-dimensional color mapping manipulation from a group including chrominance 2 modification, luminance 2 modification, color based chrominance modification, color based luminance modification, color based red modification, color based green modification and color based blue modification.

20. The method of claim 16 wherein the step of providing a computer program for selective multi-dimensional color mapping manipulation further comprises the step of providing multi-dimensional color mapping manipulation in more than two dimensions for more than one color component.

21. The method of claim 16 further comprising the step of selecting said one or more consistent color models from a group including RGB, HSV, HSI and YCrCb.

* * * * *

UNITED STATES PATENT AND TRADEMARK OFFICE
CERTIFICATE OF CORRECTION

PATENT NO. : 6,295,369 B1 Page 1 of 1
DATED : September 25, 2001
INVENTOR(S) : Kevin K. Gordon It is certified that error appears in the above-identified patent and that said Letters Patent is hereby corrected as shown below:

<u>Column 9,</u>
Line 14, change "man" to -- map --.

Signed and Sealed this

Twelfth Day of March, 2002

*Attest:*

*Attesting Officer*

JAMES E. ROGAN
*Director of the United States Patent and Trademark Office*